(12) United States Patent
Trimberger et al.

(10) Patent No.: US 7,831,873 B1
(45) Date of Patent: Nov. 9, 2010

(54) METHOD AND APPARATUS FOR DETECTING SUDDEN TEMPERATURE/VOLTAGE CHANGES IN INTEGRATED CIRCUITS

(75) Inventors: Stephen M. Trimberger, San Jose, CA (US); Austin H. Lesea, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 916 days.

(21) Appl. No.: 11/715,510

(22) Filed: Mar. 7, 2007

(51) Int. Cl.
*G01R 31/28* (2006.01)
*G01R 31/26* (2006.01)
*H01L 35/00* (2006.01)
*H01L 29/06* (2006.01)
*H01J 19/82* (2006.01)
*G01K 7/00* (2006.01)

(52) U.S. Cl. .................. 714/725; 714/740; 714/742; 324/765; 327/512; 327/548; 331/66; 374/170; 713/164

(58) Field of Classification Search .......... 714/725, 714/740, 742; 324/765; 327/512, 548; 331/66; 374/170; 713/164
See application file for complete search history.

(56) References Cited

U.S. PATENT DOCUMENTS

| | | | |
|---|---|---|---|
| 5,668,506 A * | 9/1997 | Watanabe et al. | 331/66 |
| 6,091,255 A * | 7/2000 | Godfrey | 324/760 |
| 6,390,672 B1 | 5/2002 | Vail et al. | |
| 6,614,124 B1 | 9/2003 | Brown et al. | |
| 6,737,925 B1 | 5/2004 | Logue et al. | |
| 6,778,028 B2 * | 8/2004 | Kobayashi et al. | 331/17 |
| 6,784,048 B2 | 8/2004 | Leung et al. | |
| 6,814,048 B2 | 8/2004 | Leung et al. | |
| 6,814,485 B2 | 11/2004 | Gauthier et al. | |
| 7,088,172 B1 | 8/2006 | Lesea et al. | |
| 7,391,274 B2 | 6/2008 | Hsu | |
| 7,619,486 B1 * | 11/2009 | Lesea | 331/176 |
| 2007/0218623 A1 | 9/2007 | Chua et al. | |

OTHER PUBLICATIONS

Soohoo, Alex, Lockdown! Random Numbers Secure Network SoC Designs, Apr. 1, 2003, D&R Industry Articles, pp. 1-7.*
U.S. Appl. No. 11/715,534, filed Mar. 7, 2007, Lesea, Austin, H., Xilinx, Inc. 2100 Logic Drive, San Jose, CA 95124.
New, Bernie et al., A 400-MHz Frequency Counter, Xilinx Xcell, The Quarterly Journal for Programmable Logic Users, Issue 32, Second Quarter, Apr. 30, 1999, pp. 47-49, Xilinx, Inc. 2100 Logic Drive, San Jose, CA 95124.

* cited by examiner

*Primary Examiner*—John J Tabone, Jr.
(74) *Attorney, Agent, or Firm*—Justin Liu; Thomas George (57) ABSTRACT

An integrated circuit is used to monitor and process parametric variations, such as temperature and voltage variations. An integrated circuit may include a temperature-sensitive oscillator circuit and a temperature-insensitive oscillator circuit, and frequency difference between the two sources may be monitored. In some embodiments, a parametric-insensitive reference oscillator is used as a reference to measure frequency performance of a second oscillator wherein the second oscillator performance is parametric-sensitive. The measured frequency performance is then compared to a tamper threshold and the result of the comparison is indicative of tampering.

17 Claims, 11 Drawing Sheets

METHOD AND APPARATUS FOR DETECTING SUDDEN TEMPERATURE/VOLTAGE CHANGES IN INTEGRATED CIRCUITS

FIELD OF THE INVENTION

The present invention relates generally to integrated circuits (ICs), and more specifically to detecting parametric fluctuation in integrated circuits.

BACKGROUND OF THE INVENTION

Addressing Intellectual property (IP) security in ICs is an ongoing challenge. In general, IC vendors and end users have many resources invested in developing their IP. Other participants such as the military have even a bigger stake in protecting the secrets of their IP development. Furthermore, there are parties dedicated to gaining access unlawfully to IP cores. So the need to protect the IP is very high priority.

There are many means for an intruder attempting to gain access to an IP of an IC. One method is related to parametric variation, and an example for parametric variation is a rapid change to temperature and/or voltage. Varying parameters is an effective technique to disrupt the normal operation of an IC and render it vulnerable to further incursion. Today there are methods available and being utilized to avoid unauthorized access. An example of a physical means of security implementation is the use fully sealed metal housing or various epoxy coating. These described enclosure methods, however, especially the use of an epoxy, may alter the device performance. Other methods include the use of elaborate temperature, voltage, and power sensors in conjunction with circuitries dedicated to monitor for such parametric shifts. These monitoring methods are effective but they require many external resources and careful planning for an effective implementation.

Therefore, it is desirable to provide circuits and methods that can enable vendors and end users alike to employ an anti tampering strategy with minimal effort to secure their IP from tampering due to parametric variation. It is also desirable to provide a cost effective means to employ such circuits on an IC.

SUMMARY OF THE INVENTION

In accordance with an embodiment of the present invention, a system for detecting tampering in an IC includes a reference signal insensitive to parametric variations, a signal sensitive to parametric variations, a frequency performance circuit connected to the reference signal and the sensitive signal. A compare circuit having a first input receiving the frequency performance circuit output and a second input connected to a value representing a threshold. The compare circuit asserts its output if the value of the frequency performance circuit exceeds the threshold.

In some embodiments of the present invention, a method for configuring a programmable logic device (PLD) for detecting parametric shift includes configuring a parametric-sensitive oscillator utilizing at least one logic resource of the PLD, such as a look up table, supplying a parametric-insensitive clock source to a clock manager circuit of the PLD, wherein the clock manager is generating at least one parametric-insensitive clock source, configuring the PLD to measure frequency performance of the parametric-sensitive oscillator and the parametric-insensitive clock of the clock manager circuit and generating a value indicative of parametric shift, and comparing the measured value to a threshold and generating a compare signal responsive to the difference.

Some embodiments of the present invention comprise an integrated circuit having a parametric-stable clock source and a parametric-variant clock source. The above two clock sources are connected to a counter circuit; the counter circuit counts the parametric-stable clock source and the parametric-variant clock source and outputs a value representative of the counting. A comparator circuit compares the value produced by the counter circuit to a predetermined threshold, the comparator asserts an output if the value produced by the counter circuit exceeds the threshold.

BRIEF DESCRIPTION OF THE DRAWINGS

The present invention is illustrated by way of example, and not by way of limitation, in the following figures.

DETAILED DESCRIPTION OF THE DRAWINGS

In the following description, numerous specific details are set forth to provide a more through understanding of the present invention. However, it will be apparent to one skilled in the art that the present invention can be practiced without these specific details. In other instances well-known circuits or devices may be omitted or presented in an abstract form in order to avoid obscuring the present invention.

Figure 1:
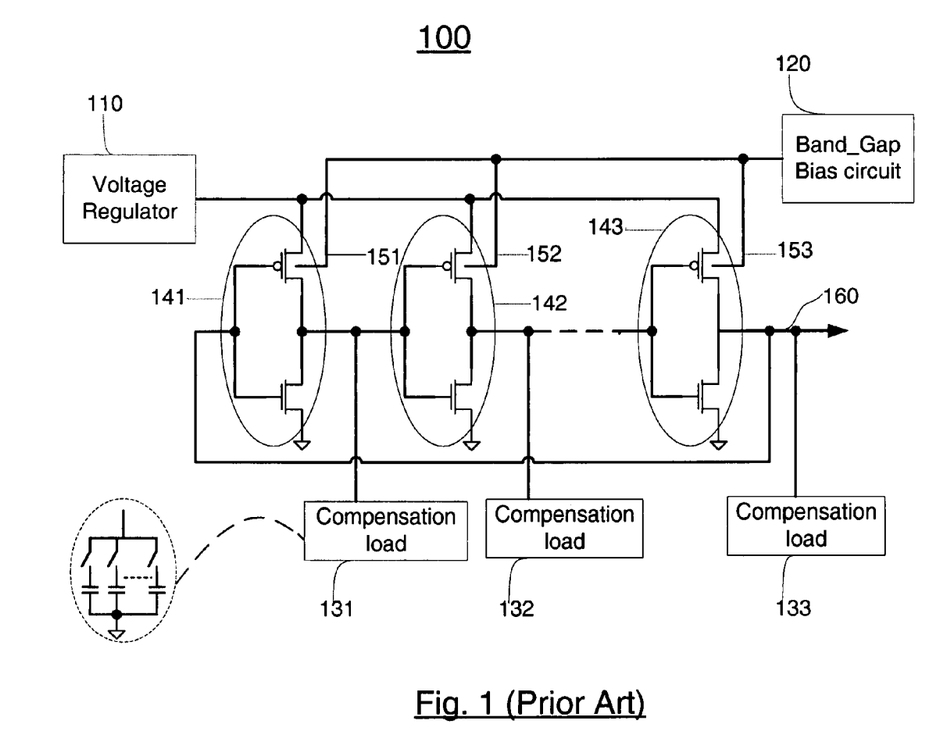
FIG. 1 illustrates a typical ring oscillator with various means of compensation.

FIG. 1 illustrates a typical ring oscillator 100 with various means of compensation. An odd number of inverting gates are required to construct a ring oscillator. Inverting gates 141-143, are shown as inverters consisting of NMOS transistors and PMOS transistors, the PMOS transistors having body nodes 151-153 according to this embodiment. Inverting gates 141-143 are coupled in series and output of inverting gate 143 is coupled to input of inverting gate 141. A voltage regulator 110 is coupled to supply nodes of inverting gates 141-143. Voltage regulator 110 provides a regulated bias to the ring oscillator 100, and it can be adjusted for optimum performance and/or to compensate for process and/or temperature variation.

Circuits 131-133 are compensation loads, and they can be active or passive capacitive loads. As shown in FIG. 1, the compensation loads are passive capacitance loads. The compensation loads 131-133 are coupled to output nodes of inverting gates 141-143. Compensation loads 131-133 can be configured to delay or speed up the ring oscillator operation by adding or removing capacitance, respectively. For example, if capacitances are added, this can slow down the operation of the ring oscillator and thus reduce output frequency of the ring oscillator. Another method of adjusting the ring oscillator performance is to couple a programmable band-gap circuit 120 to a body node of a transistor, where the programmable band-gap circuit can provide voltage bias. The ring oscillator 100 shown in FIG. 1, band-gap voltage bias is applied to the body nodes of PMOS transistors. Threshold voltage (Vt) of the PMOS transistors changes in accordance with applied band-gap voltage bias, thus changing switching characteristics of the PMOS transistor thus affecting the ring oscillator operation.

Ring oscillator 100 can be adjusted to produce the desired output frequency at given conditions. In some instances, at least one compensation circuit is needed to attain the desired result. A person skilled in the art can determine what compensation circuit(s) is needed to meet the performance criteria. Circuits 110, 120, 131-133 may need additional support circuits in order fully utilize these compensation mechanisms.

Figure 2A:
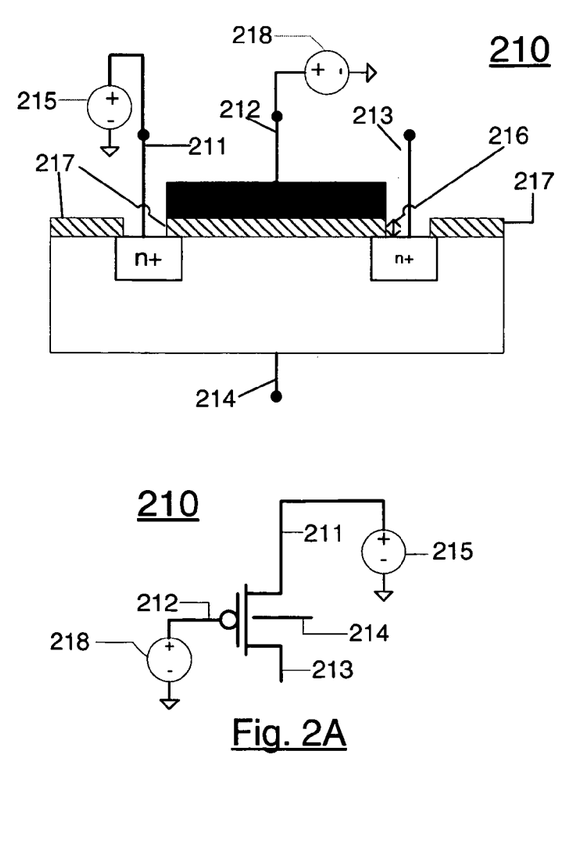
FIG. 2A illustrates a drawing of a typical PMOS transistor having a thin oxide thickness.

FIG. 2A illustrates a drawing of a typical PMOS transistor fabricated in a 65 nm process, where the typical PMOS transistor has a first oxide, where the first oxide has a thin oxide thickness. The typical PMOS transistor 210 has connection nodes 211, 212, 213, and 214, which correspond to source, gate, drain, and body connections, respectively. Transistor 210 can be fabricated in a 65 nm process, and has a first oxide 217 where the first oxide has a thin oxide thickness 216. For example, in some embodiments, the thin oxide thickness 216 maybe in the range of 12.2-13.1 Å (Angstrom). Transistor 210 is also coupled to bias voltages 215 and 218. Voltage bias 215 can be applied to the source or the drain of transistor 210 in accordance to the design specifications, and bias voltage 218 can be coupled to the gate node of transistor 210 and typically has a similar value as bias 215. Speed performance of transistor 210 is sensitive to temperature as shown in curve 260 of graph 220 in FIG. 2C, as will be described in detail below.

In other embodiments, other transistors having temperature sensitivity behavior can be fabricated in a 65 nm process. For example, a temperature-sensitive NMOS transistor can be fabricated in a 65 nm process having a first oxide 217 where the first oxide has a thickness 216, and bias voltages 215 and 218. In some embodiments, other oxide thicknesses and/or bias voltages may be used.

Figure 2B:
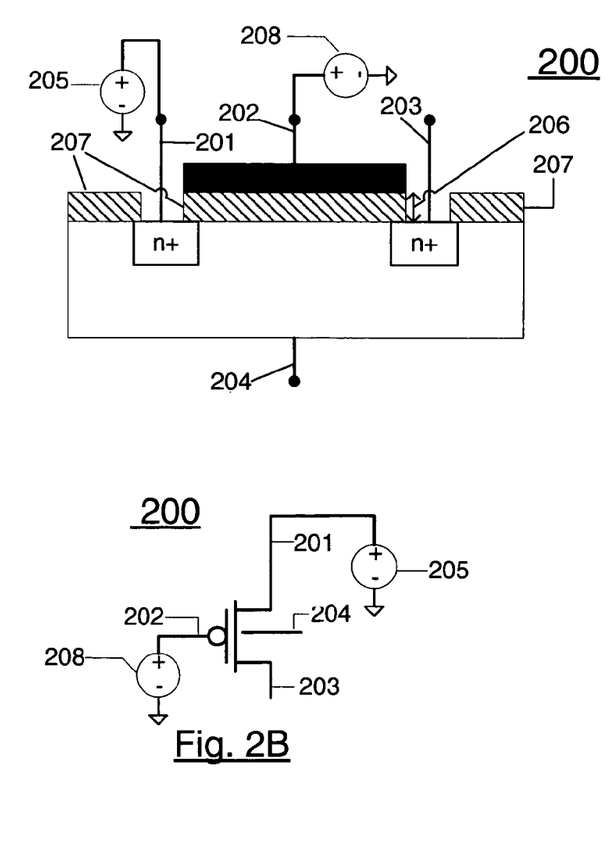
FIG. 2B illustrates a drawing of a temperature-insensitive PMOS transistor having a mid oxide according to an embodiment of the invention.

FIG. 2B illustrates a drawing of a temperature-insensitive PMOS transistor fabricated in a 65 nm process, where the temperature-insensitive PMOS transistor has a second oxide, where the second oxide has a mid oxide thickness according to an embodiment of the present invention. Transistor 200 is a temperature-insensitive PMOS transistor having connection nodes 201, 202, 203, and 204, which correspond to source, gate, drain, and body connections, respectively. Transistor 200 can be fabricated in a 65 nm process, and has a second oxide 207, where the second oxide has a mid oxide thickness 206. For example, in some embodiments, the mid oxide thickness 206 maybe in the range of 25.4-28.2 Å (Angstrom). Transistor 200 is biased by element 205, where element 205 may supply voltage in a range of 0.9-1.1 volts and can be coupled to either the source or the drain of transistor 200. In one embodiment, element 205 is coupled to the source 201 of PMOS transistor 200, and a second bias element 208 may be applied to the gate 202 of the transistor 200. Element 208 may provide a bias voltage equivalent to Vcc+Vt according to one embodiment of the present invention, where Vcc corresponds to a core voltage, and Vt correspond to a threshold voltage of transistor 200. Elements 205 and 208 can have voltages other than what have been indicated, and can yield the same temperature-insensitive behavior according to an embodiment of this invention. Speed performance of transistor 200 is shown in curve 250 of graph 220 in FIG. 2C, as will be described in detail below. In some embodiments, transistor 200 can be fabricated in any process node 65 nm or smaller, provided that processes smaller than 65 nm have capabilities to produce transistors with geometry equivalent to geometry of transistor 200.

In another embodiment, a different transistor having equivalent temperature-insensitivity behavior can be fabricated in a 65 nm process according to the embedment of this invention. For example, a temperature-insensitive NMOS transistor may be fabricated in a 65 nm process having a second oxide 207 where the second oxide has a mid oxide thickness 206, and voltage biases 205 and 208. In some embodiments, other oxide thicknesses and/or bias voltages may be used.

Figure 2C:
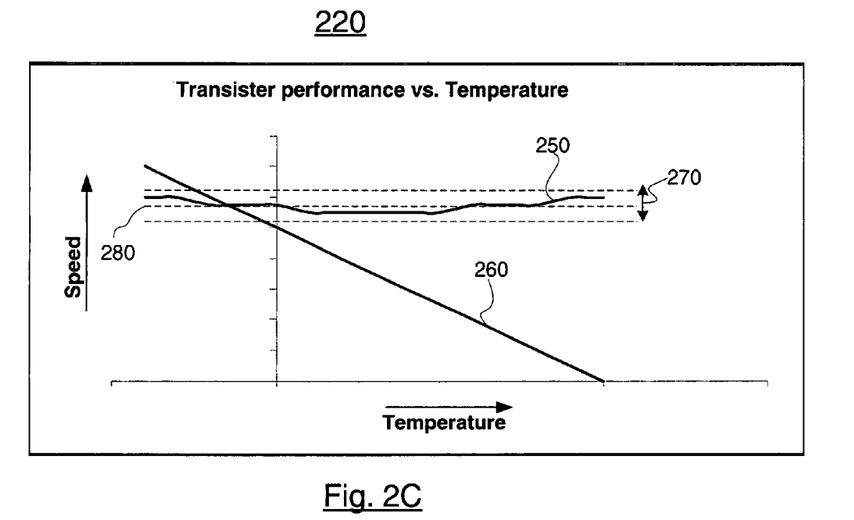
FIG. 2C illustrates a graph showing a speed performance of various transistors over a temperature range.

FIG. 2C illustrates, a graph showing a speed performance of various transistors over temperature range. Curve 260 represents speed performance of a typical transistor, such as transistor 210 of FIG. 2A, over a temperature range. In general, speed of transistor 210 decreases as temperature increases.

Curve 250 represents speed performance of a temperature-insensitive transistor, such as transistor 200 of FIG. 2B, over the same temperature range. The temperature-insensitive transistor performance illustrated in curve 250 is insensitive to temperature variation, therefore having a desirable behavior. Speed indication 280 represents average speed over temperature range, and speed indication 270 represents speed variance over the same temperature range of a temperature-insensitive transistor. The speed variance 270 can be +/−15% the average speed 280, according to an embodiment of this invention. Transistor 200 generally has equivalent behavior to curve 250 and transistor 210 generally has equivalent behavior to curve 260. Transistors 200 and 210 can be fabricated on a single die of a silicon wafer in a 65 nm process having at least two oxide thicknesses according to an embodiment of this invention. Smaller than 65 nm processes may be used to produce transistor 200. Note that the curves shown in FIG. 2C are merely representative, and actual transistors may have different curves. In general, a typical transistor has performance that varies with temperature, and a temperature-insensitive transistor maintains a relatively constant performance (e.g. within +/−15% of an average speed performance) over a temperature range.

Figure 3A:
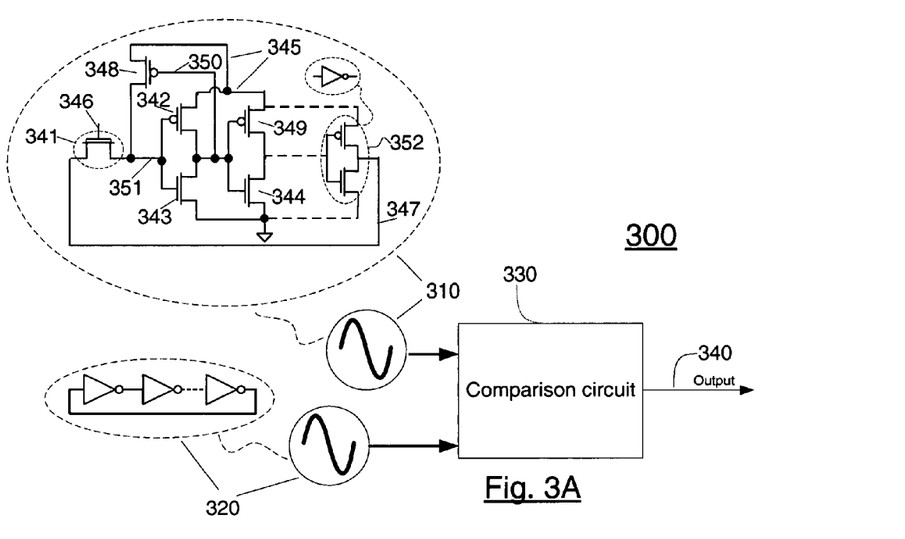
FIG. 3A is a block diagram of a frequency comparison circuit that provides an output indicative of a frequency difference according to an embodiment of the invention.

FIG. 3A is a block diagram illustration of a frequency comparison circuit according to an embodiment of the present invention. Circuit 300 provides an output 340 indicative of a comparison of the two oscillating signals provided by circuits 310 and 320, where the oscillating signals can be any frequency. Output 340 can be monitored and the data can be processed and/or stored for analysis and data comparison over the life of an IC. The data comparison operation can, for instance indicate a factor shift, for example a voltage drop or a frequency drift, where a corrective action can be triggered to adjust at least one element of an IC.

Circuit 310 is a temperature-insensitive oscillator, such as a ring oscillator, having at least one temperature-insensitive transistor 200. According to an embodiment of the present invention, circuit 310 can be constructed incorporating a transistor 341, where transistor 341 is a NMOS transistor fabricated in a 65 nm technology having an mid oxide and having a gate 346 biased by a voltage of about Vcc+Vt. Source node of transistor 341 is coupled to gate nodes of transistor 343 and transistor 342 (node 351). Transistor 343 has a thin oxide and a low Vt, transistor 342 has a thin oxide and regular Vt. Outputs from transistors 342 and 343 (node 350), is coupled to the gate of transistor 348 which is a weak PMOS transistor processed having a thin oxide and regular Vt. Node 350 is also coupled to the gates of transistors 344 and 349. The drain of transistor 348 is coupled to node 351 and the source of transistor 348 is coupled to a supply node 345. Transistors 344 and 349 are processed to have thin oxide and regular Vt, and are coupled to form an inverter. The feedback path 347 of the temperature-insensitive ring oscillator couples the output of the inverter 352 to the drain node of transistor 341, as shown in circuit 310 of FIG. 3A. Node 345 is a supply node and can be biased by a voltage regulator having a voltage in a range of 0.9-1.1 volts. Transistor 341 of circuit 310 is a temperature-insensitive, and has performance equivalent to curve 250 of FIG. 2C. In other examples, additional inverters may be coupled between transistors 349 and 344, and inverter 352. The added inverters may add delay, therefore slowing down operation of the ring oscillator 310, meaning lower output frequency at node 347.

Circuit 320 is a temperature-sensitive oscillator, and has a performance that varies depending on temperature. A simple ring oscillator can be used as circuit 320 in some embodiments.

Circuit 330 is a frequency comparator that compares outputs from circuits 310 and 320 according to an embodiment of the present invention. In some embodiment, circuit 330 can use counters. For example, circuit 310 can trigger counter circuits and thus generate gated signals used to sample another signal source such as output of circuit 320. Other methods to compare frequencies from two sources are well known to persons skilled in the art. Frequency comparator 330 provides an output 340.

Figure 3B:
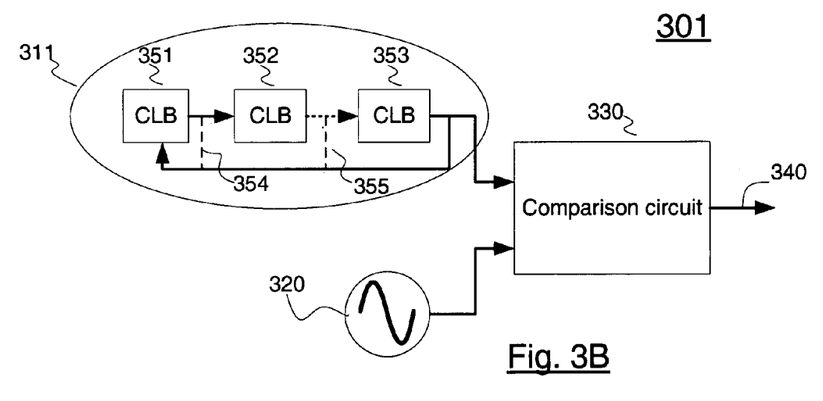
FIG. 3B is a block diagram of a frequency comparison circuit that illustrates the use of a configurable logic block (CLB) according to an embodiment of the invention.

FIG. 3B is a block diagram of a frequency comparison circuit illustrating the use of a configurable logic block (CLB) according to an embodiment of the invention. Circuit 311 is a temperature-insensitive ring oscillator using CLBs 351-353 and can be coupled to construct the temperature-insensitive ring oscillator. A typical CLB has many configurable resources such as, logic gates and lookup tables. The temperature-insensitive ring oscillator design can use all or part of the resources of the CLB. For instance, one or more CLBs 351-353 may be configured as delay elements or inverting gates to form a ring oscillator.

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

In general, an IC has many frequency rates, and a person skilled in the art can determine the proper operating frequency of a design. Therefore, it is desirable to have a circuit that can be configured to yield the proper frequency. A ring oscillator frequency depends on the length of inverting gates that are coupled in series. For example having more inverting gates or delay elements in the ring oscillator can yield a lower output frequency. Constructing circuit 311 utilizing CLBs can be desirable due to interconnectivity options available within a CLB or several coupled CLBs. Circuit 311 can be constructed in one CLB or multiple CLBs. Connections 354-355 are used in some embodiments of the present invention to adjust the oscillator frequency. A person skilled in the art can determine, for example, which coupling node 345 or 355 is appropriate for their design.

Figure 4:
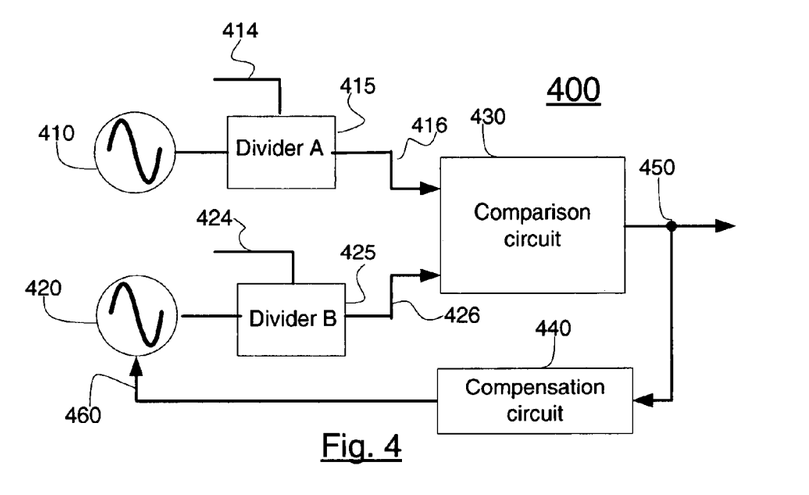
FIG. 4 is a block diagram of a frequency comparison circuit having a compensation circuit coupled between a frequency comparator and a temperature-sensitive oscillator circuit, and having a divider circuits coupled to output of the oscillators according to an embodiment of the invention.

FIG. 4 is a block diagram of a frequency comparison circuit 400 having a compensation circuit coupled between the output of a temperature-insensitive oscillator circuit and of a temperature-sensitive oscillator circuit, according to an embodiment of the invention. In some embodiment, a frequency comparison circuit may include divider circuit coupled to outputs of the oscillators.

Circuit 440 is a compensation circuit which outputs control signal(s) 460 in response to range of signal(s) 450. In one embodiment of the present invention, circuit 430 can output a signal that can have a varying pulse width in response to frequency difference between circuit 410 and 420. Signal(s) 460 is coupled to circuit 420. Circuit 420 can adjust its operation in response to signal(s) 460. Circuit 100 can be used as circuit 420 according to an embodiment of the present invention.

Circuit 415 is a divider circuit having control signal(s) 414 according to an embodiment of this invention. Circuit 415, coupled between circuit 410 and circuit 430, and may include a divide ratio that can be configured using control signal 414. In some embodiments, the divider circuit 415 is used to produce an output signal 416 that is equivalent to signal 426. Other embodiments can include divider circuit 425 coupled between oscillator 420 and comparison circuit 430 for added design flexibility.

Figure 5:
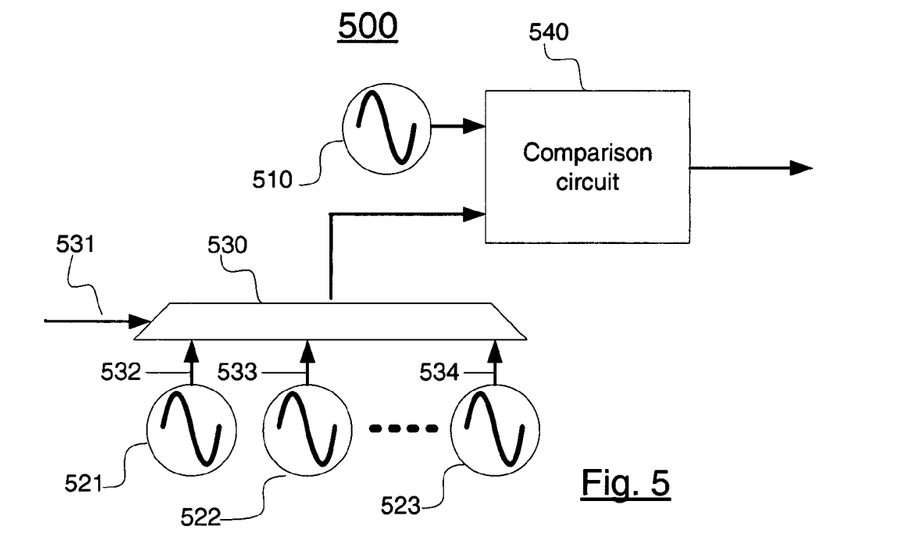
FIG. 5 is a block diagram of a frequency comparison circuit having a plurality of temperature-sensitive oscillator circuits coupled to inputs of a select circuit that is coupled to an input of a frequency comparator according to an embodiment of the invention.

FIG. 5 is a block diagram of a frequency comparison circuit 500 having a plurality of temperature-sensitive oscillator circuits coupled to inputs of a select circuit that is coupled to an input of a frequency comparator according to an embodiment of the invention. Circuit 530 is a select circuit, selecting an output from plurality of temperature-sensitive oscillators 521-523 may be coupled to an input of circuit 540 according to an embodiment of the present invention.

Multiple temperature-sensitive oscillator instantiations 521-523 are shown in FIG. 5. For instance a design may require more than one temperature-sensitive oscillator. The IC can, for example, record multiple readings from the temperature-sensitive oscillators 521-523 and calculate an average temperature. In another example, the IC can determine what part of the IC may be experiencing temperature variation. Yet in another example, the IC can use the multiple temperature-sensitive oscillators as a part of a redundancy temperature monitoring system.

The select circuit 530 has select control signal(s) 531 enabling the select circuit to select many inputs 532-534. The select control signal(s) 531 can be manually configured or coupled to an automatic timing circuit according to an embodiment of the present invention. An example of an automatic timing circuit is a counter circuit coupled to a clock configured as a timer circuit. Other examples of a timer circuits are available and well know to persons skilled in the art.

Figure 6:
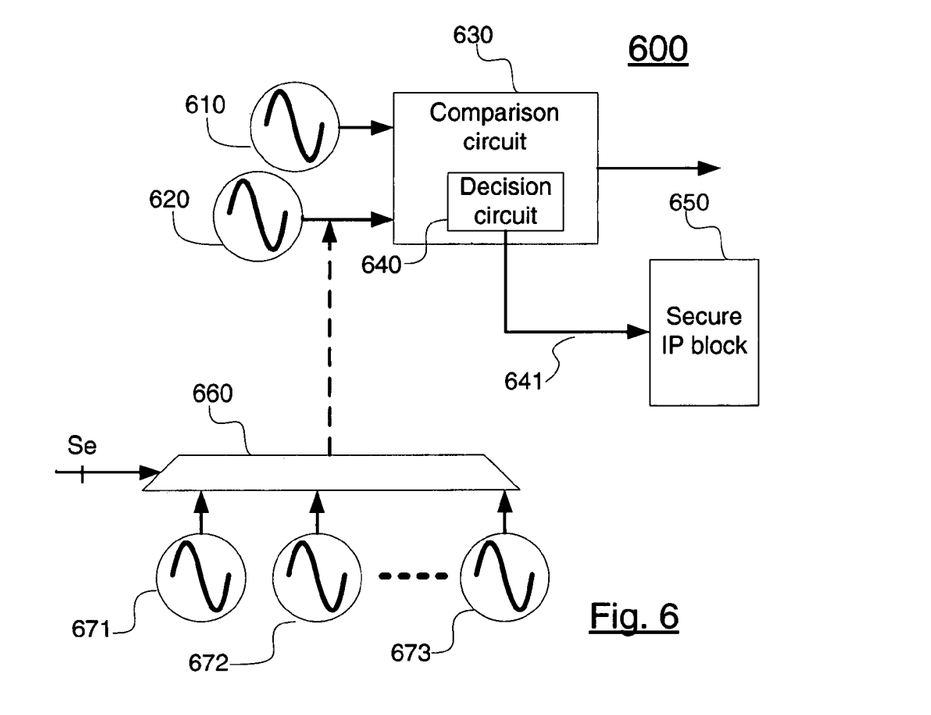
FIG. 6 is a block diagram of a frequency comparison circuit having a decision circuit coupled to an input of a secure IP block according to an embodiment of the invention.

FIG. 6 is a block diagram of a frequency comparison circuit 600 having a decision circuit coupled to an input of secure IP block according to an embodiment of the invention.

Circuit 640 is a decision circuit that can assert output 641 in response to rapid temperature change. For example, a rapid temperature change can be a 10 degree change in temperature in a 100 ns time duration. According to one embodiment of the present invention, circuit 640 can evaluate inputs from a temperature-insensitive oscillator circuit 610 and temperature-sensitive oscillator circuit 620 and assert the output 641 in response to a large frequency disparity in a sampled time duration, where the sampled time duration can be programmable.

Circuit 640 can assert output signal 641, which is coupled to a Secure IP block circuit 650 and trigger a security protocol. In one embodiment of the present invention the output signal 641 can disable circuit 650 when asserted. In another embodiment output signal 641 can be used to power down at least one portion of an IC in response to an abrupt temperature change. Other possible security protocols can include erasing all or partial configuration of the PLD, or resting the IC, or destroying the IC.

Circuit 600 can include a select circuit 660 and plurality of temperature-sensitive oscillators 671-673 according to an embodiment of the present invention. Circuit 600 with select circuit 660 can be used to verify abrupt temperature change from at least one location, and may assert output 641 as a response to the abrupt temperature change or possible security breach.

Figure 7:
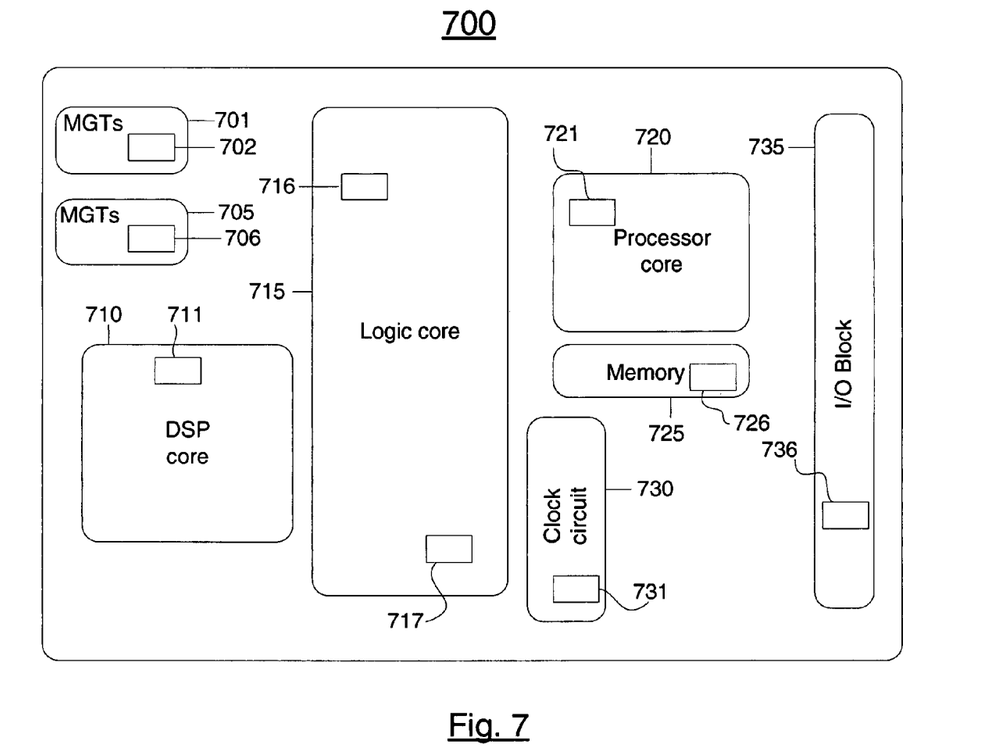
FIG. 7 is a block diagram of an integrated circuit having design blocks including frequency comparison circuits according to an embodiment of the invention.

FIG. 7 is a block diagram of an integrated circuit having a plurality of blocks including frequency comparison circuits according to an embodiment of the invention.

Circuit 700 can include plurality of blocks such as a Digital Signal processor core (DSP) 710, Multi Giga-bit Transceiver core (MGT) 701, 705 and other blocks. The mixed signal design blocks can have a single or multiple frequency comparison circuits integrated in each block according to an embodiment of the present invention. Output(s) from the frequency comparison circuit(s) can be observed, and processed in accordance to a design parameters, where the design parameters can include reducing operating frequency or/and turning power off to select blocks or the entire IC. For example, circuit 710 may have a frequency comparison circuit 711. When circuit 711 asserts its output in response to temperature variation, circuit 700 can reduce the operating frequency of circuit 710 as one possible action. As another example, circuit 705 may have a frequency comparison circuit 706. When circuit 706 asserts its output in response to temperature variation, circuit 700 can power down circuit 705 as one possible action. In another embodiment of the present invention, a single frequency comparison circuit can be placed in an IC. The frequency comparison circuit can be any one of circuits 300, 301, 400, 500, 600, or another configuration employing a temperature-insensitive transistor.

Figure 8:
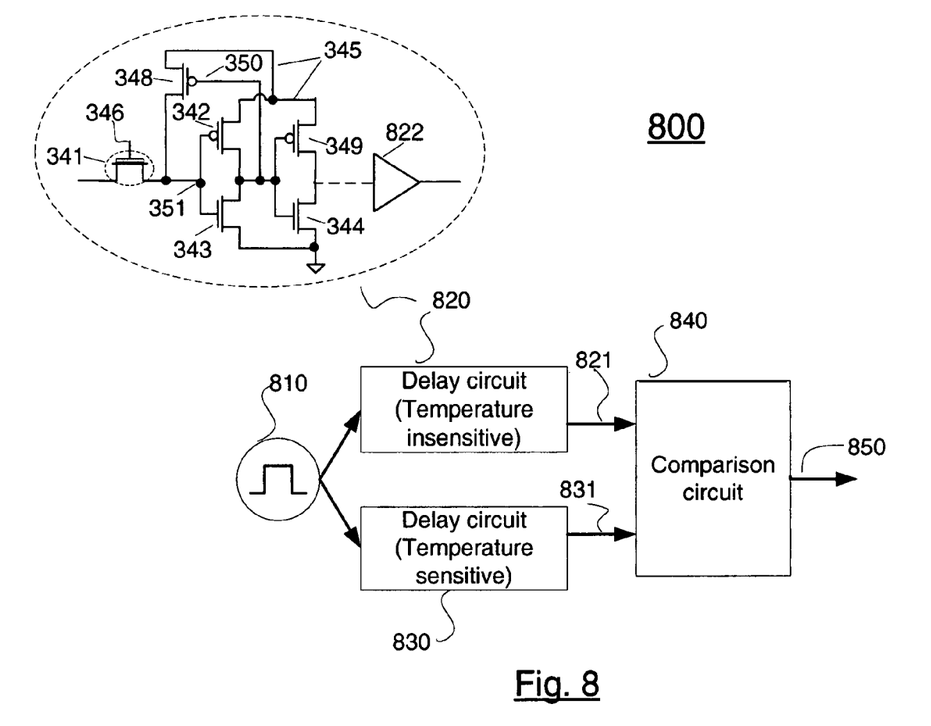
FIG. 8 is a block diagram of a delay comparison circuit having an output indicative of a phase difference between input signals according to an embodiment of the invention.

FIG. 8 is a block diagram of a delay comparison circuit 800 having an output indicative of a phase difference between input signals according to an embodiment of the invention. Circuit 840 is a phase comparator having an output 850 indicative of a phase difference between inputs 821 and 831.

Circuit 810 is a pulse generator according to an embodiment of the present invention. Circuit 810 can provide an output coupled to inputs of circuit 820 and circuit 830, where circuit 820 is a temperature-insensitive delay circuit and circuit 830 is a temperature-sensitive delay circuit. Circuit 820 is similar to circuit 310 of FIG. 3A as previously described except for elements 352 and feedback path 347. Circuit 820 has a buffer 822 coupled to the output of transistors 344 and 349. Transistor 341 of circuit 820 of FIG. 8 is a temperature-insensitive, where the delay performance is temperature-insensitive. In some embodiment, transistors used in constructing the buffer 822 can have the same specifications as transistors 344 and 349. Temperature-sensitive delay circuit 830 can include one or more buffers, where a buffer can include an even number of inverting.

For example, a given temperature condition, circuit 800 can indicate negligible phase difference at node 850. When temperature fluctuates, node 850 can provide a signal indicative of a measurable phase difference, where the phase difference can be attributed to a corresponding temperature variance. Circuit 810 can be an internal or external clock source or a pulse generator according to an embodiment of the current invention.

Figure 9:
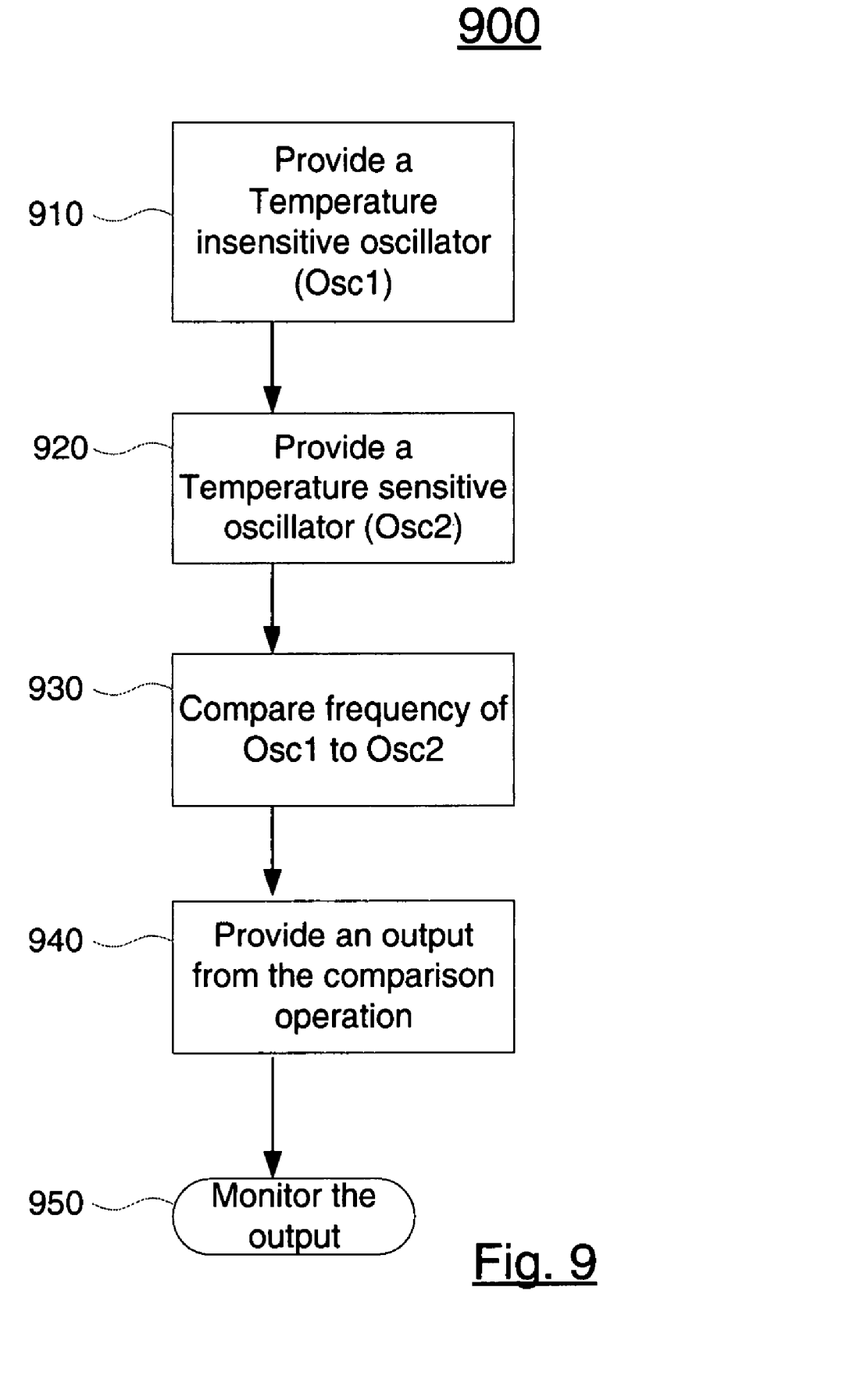
FIG. 9 is a flow chart illustrating a method of detecting temperature variance by comparing two oscillator outputs according to an embodiment of the invention.

FIG. 9 is a flow chart illustrating a method of detecting temperature variance by comparing two oscillator outputs according to an embodiment of the present invention. The method includes providing a temperature-insensitive oscillator (Osc1) 910, a temperature-sensitive oscillator (Osc2) at step 920. Output of Osc1 and Osc2 are compared at step 930. An output from the comparison operation is provided at step 940. The output of the comparison operation is monitored and/or processed at step 950.

In some embodiments, an IC can be partially or fully powered down in response to temperature conditions approaching IC performance degradation. In some embodiments, a signal indicative of rapid temperature variance can be outputted. In some embodiments, the method may include reporting, storing, and comparing data from various process corners, and comparing current results against stored historic process data. This enables the generation of a signal indicative of process shift. Monitoring and processing results in this way can enable modifying process parameters to yield a reliable, producible IC.

Figure 10:
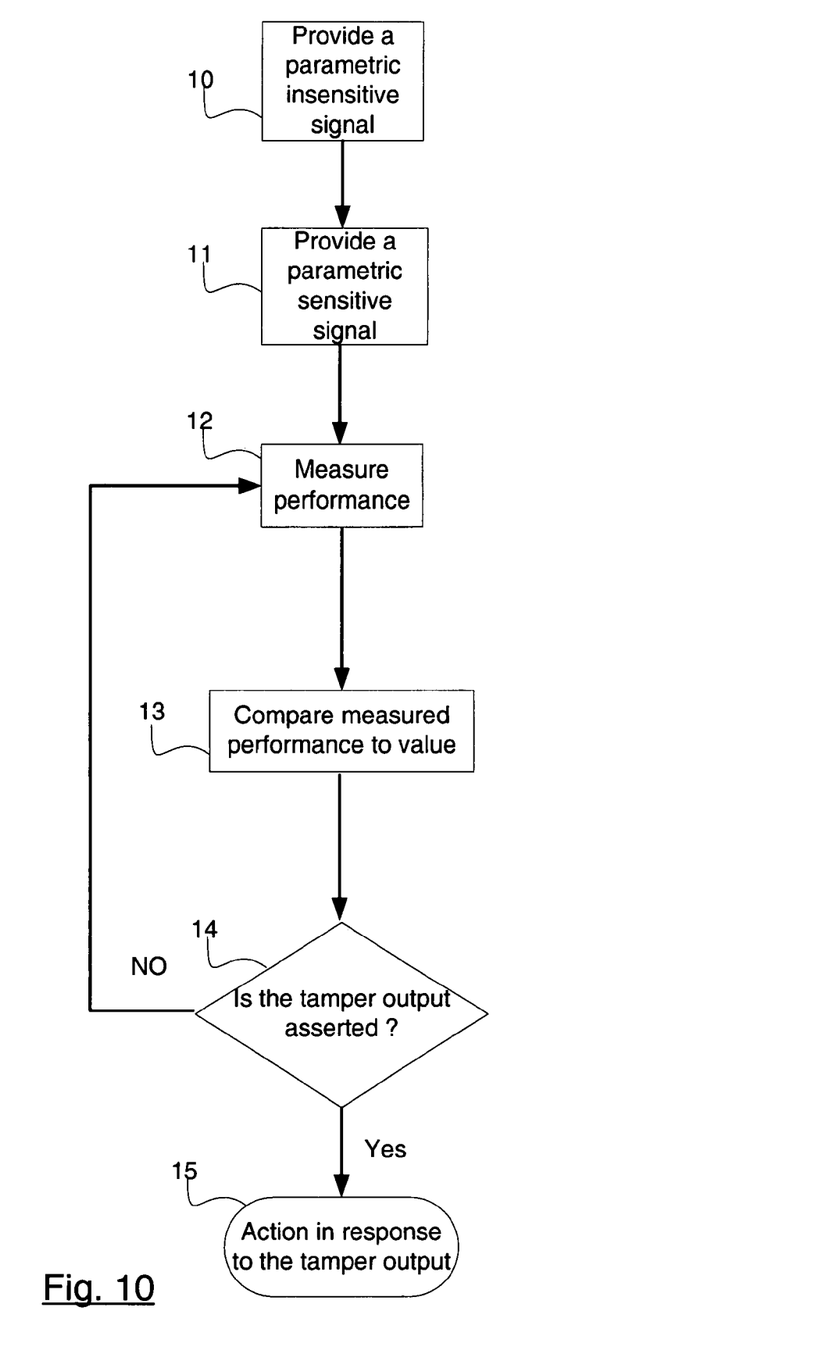
FIG. 10 illustrates a flow chart diagram according to an embodiment of the present invention.

FIG. 10 illustrates a flow chart diagram according to an embodiment of the present invention. The method illustrated in FIG. 10 can be used to detect IC tampering due to a parametric shift. The parametric shift may include temperature variations and/or voltage variations and/or process variations. The method includes providing a parametric-insensitive clock (Step 10), a parametric-sensitive clock (Step 11), and measuring frequency performance of the parametric-insensitive clock and the parametric-sensitive clock (Step 12). The parametric-sensitive clock may be sensitive to temperature variations and/or voltage variations and/or process variations. An example of the measuring can be counting one clock source in reference to the other clock source and generating an output indicative of the counting. One form for representing the output indicative of the counting can be a pulse that has a varying pulse width. A comparison circuit receives the measured frequency and a value representing a threshold, and generates a tamper signal (Step 13). The tamper signal generated by the comparison circuit, when asserted, indicates tampering. At step 14 a decision is made based on the tamper signal. If the tamper signal is asserted, then action will be taken in step 15. If the tamper is signal is not asserted, the method returns to step 12 to continue measuring and comparing frequency performance. The method steps recited above for detecting parametric shift may be used to configure a PLD having a core oscillator source and a circuit design.

Figure 11:
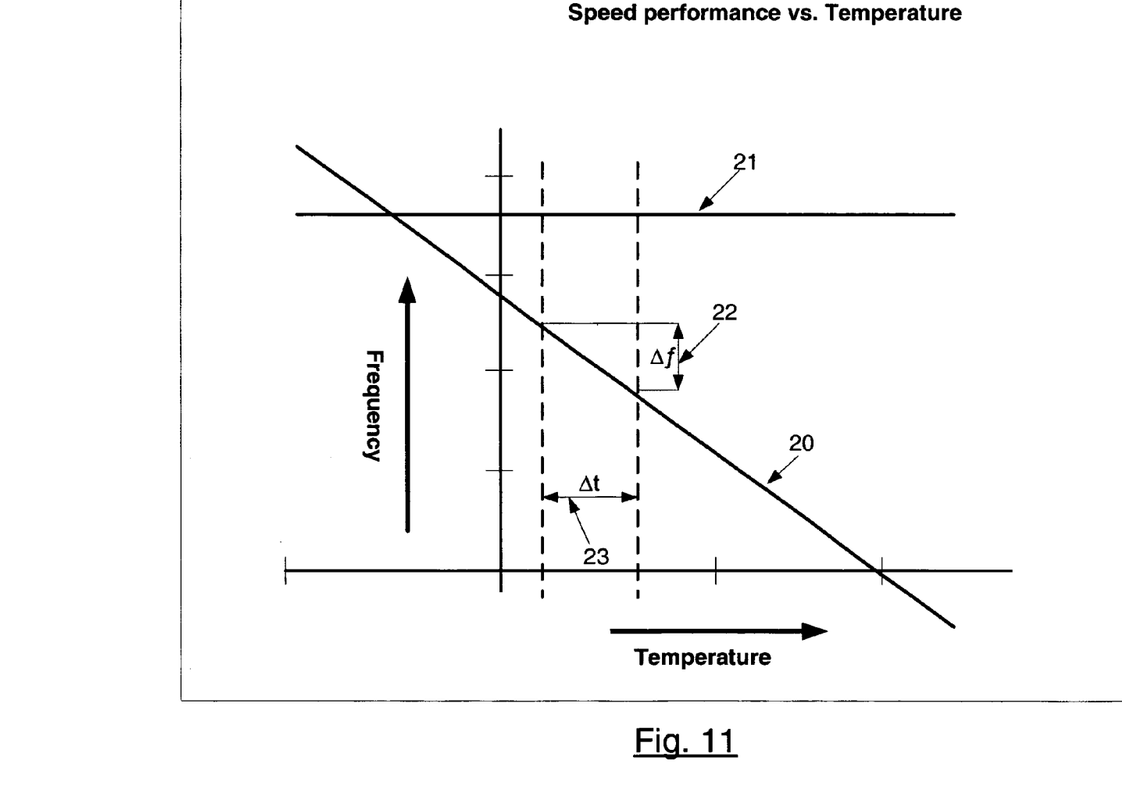
FIG. 11 illustrates a graph showing performance of a temperature-insensitive oscillator and a typical temperature-sensitive oscillator.

FIG. 11 illustrates a graph showing performance of a temperature-insensitive oscillator and a typical temperature-sensitive oscillator. Curve 20 represents a typical temperature-sensitive oscillator frequency performance over a temperature range. In general oscillator frequency decreases as temperature increases. Curve 21 illustrates temperature-insensitive oscillator frequency performance over the same temperature range. The temperature-insensitive oscillator has insignificant frequency performance change over the temperature range. The temperature-insensitive oscillator output can be used as a reference to capture variation in other clock sources that have frequency performance similar to curve 20. An example of frequency to temperature correlation is illustrated in FIG. 11. For any given frequency there is a corresponding temperature. Changes in temperature 23 will correspond to changes in frequency 22 of the temperature-sensitive oscillator. This relationship can be captured and used to calibrate an IC or detect temperature variation of an IC. Note, FIG. 11 is a simplistic representation of the temperature-sensitive and the temperature-insensitive oscillators, and the drawing is for illustration purposes only.

Figure 12:
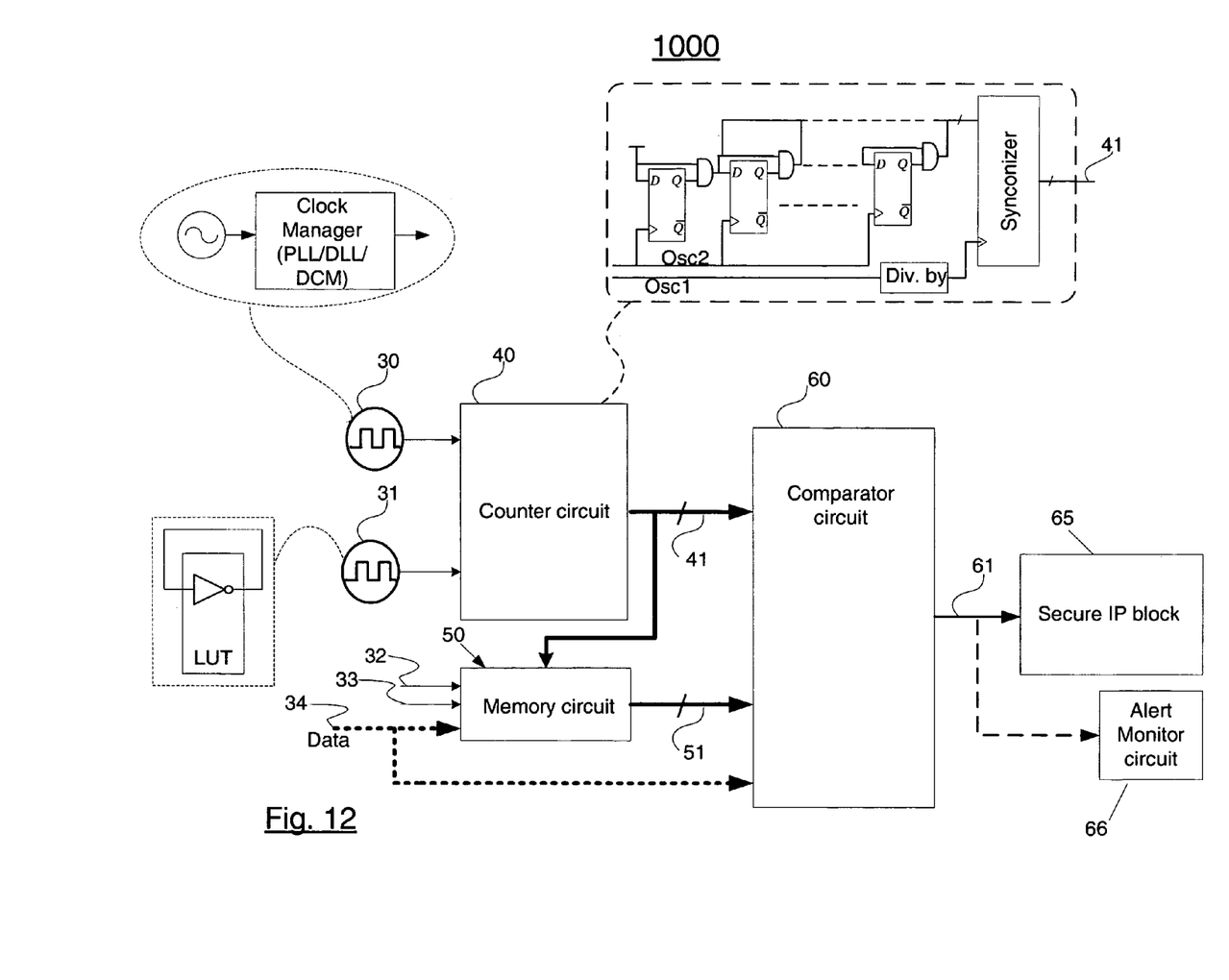
FIG. 12 is a block diagram of a frequency comparison circuit according to an embodiment of the invention.

FIG. 12 is a block diagram of a frequency comparison circuit according to an embodiment of the present invention. In some embodiments, the circuit shown in FIG. 12 can be used to perform some or all the method steps of FIG. 10. The circuit in FIG. 12 is a frequency comparison circuit that can be used to detect tampering, having a temperature-sensitive oscillator 31, a temperature-insensitive oscillator 30, a counter circuit 40, a storage element 50, a comparator circuit 60, and a secure IP block 65. The temperature-sensitive oscillator 31 can be configured using one or more look up tables (LUTs) of a programmable logic device (PLD). For example, in one embodiment a single LUT is configured as an inverter, and the output of the inverter is connected to its input forming a ring oscillator. This implementation will yield a very high frequency and high area and power efficiency. The high frequency can increase resolution of frequency measurement. In some embodiments, the temperature-sensitive oscillator 31 is the core oscillator and has a frequency response over a temperature range similar to curve 20. Other implementations of oscillator 31 that have comparable performance can be implemented internal or external to an IC and it is well known to persons skilled in the art. The temperature-insensitive oscillator 30 has frequency performance similar to curve 21 of FIG. 11. The temperature-insensitive oscillator 30 can be internal or an external temperature-insensitive clock source. Other examples of the temperature-insensitive oscillator 30 can include a temperature-insensitive reference signal or clock connected to a clock manager circuit providing a range of frequencies that is applicable to the design specification. The clock manager circuit may be internal or external to the IC, an example of an internal clock manager circuit can be a phase lock loop (PLL) or a digital clock manager (DCM) of the PLD including, delay lock loop (DLL). The PLD can also include a clock data recovery (CDR) of a multi gigabit transceiver (MGT) having the PLL that can be used as the clock manager. The temperature-insensitive oscillator 30 also can be a temperature-insensitive ring oscillator having at least one temperature-insensitive transistor such as ring oscillator 310 of FIG. 3A. Clock 30 and clock 31 are connected to inputs of a counter circuit 40. Counter circuit 40 counts cycles of the temperature-sensitive oscillator 31 referenced to the temperature-insensitive oscillator 30. For instance counter circuit 40 may count cycles of oscillator 31 during one cycle of oscillator 30. A divider circuit can be used to divide the temperature-insensitive oscillator 30, the divider can be programmable. Dividing clock 30 can yield a better accuracy and repeatability, due to increasing the time period for counting clock 31. Note that in some embodiments, cycles of oscillator 30 may be counted during one period of oscillator 31. Other implementations of the counter circuit 40 and/or the method of referencing one clock signal to another are well known to persons skilled in the art. The counter circuit output 41 is connected to an input of the comparator circuit 60 and the other input of the comparator is connected to a value 51. The value 51 can be sourced internally or externally. The value 51 is a threshold or tamer limit used to compare the counter circuit output 41. The value 51 can be written into a memory element 50 using typical memory control signals such that write enable 32, and load or a clock signal 33. The value 51 can be written manually via signal 34 or using the counter circuit output 41 during the setup phase of circuit 1000. The value can also be loaded from an external source to the input of the comparator circuit via signal 34. The comparator circuit 60 outputs a tamper signal 61 connected to a secure IP block 65. The tamper signal 61 is asserted if counter circuit output 41 exceeds the value 51. The IP block 65 may contain proprietary designs, such that when tamper signal 61 is asserted the IP block will react to protect its contents. As an example, the IP block can halt operation and/or erase stored information, or self destruct. Tamper signal 61 can also be connected to an alert monitor circuit 66 that can be used as a part of a system-wide tampering and/or temperature change alert monitoring. Other refinements to ensure comprehensive tampering detection may include multiple instantiations of circuit 1000 and/or using multiple instantiations of circuit 1000 coupled to other temperature-insensitive and temperature-sensitive oscillators having an oscillator phase different from oscillator phase of source 30 and 31.

The above example describes an IC for detecting a frequency variation of an oscillator due to temperature change. Other parametric shifts, such as supply voltage variations can be detected using the circuit described above. An example for IC for detecting a frequency variation of an oscillator due to supply voltage change can include a voltage-sensitive oscillator having an output frequency that varies as supply voltage changes, and a voltage-insensitive oscillator having an output frequency that is insensitive to supply voltage change. In general, a voltage-sensitive oscillator output frequency decreases as supply voltage decreases.

Further, capacitors, pull-ups, pull downs; transistors, level shifters, P-channel transistors, N-channel transistors, biasing circuits, oscillators, clock dividers, and other components other than those described herein can be used to implement the invention. Oscillators may be replaced with other means of producing time measurements. Transistor and non-transistor devices may be built with parametric sensitivity and with parametric-insensitivity that permit implementation of the invention. Active-high signals can be replaced with active-low signals by making straightforward alterations to the circuitry, such as are well known in the art of circuit design. Logical circuits can be replaced by their logical equivalents by appropriately inverting input and output signals, as is also well known.

Moreover, some components are shown directly connected to one another while others are shown connected via intermediate components. In each instance the method of interconnection establishes some desired electrical communication between two or more circuit nodes. Such communication can often be accomplished using a number of circuit configurations, as will be understood by those of skill in the art.

Accordingly, all such modifications and additions are deemed to be within the scope of the invention, which is to be limited only by the appended claims and their equivalents. Note that claims listing steps do not imply any order of the steps.

What is claimed is:

1. A method for detecting tampering in an Integrated circuit (IC) due to parametric shift comprising:
   supplying a reference signal, wherein the reference signal is insensitive to the parametric shift;
   supplying a sensitive signal, wherein the sensitive signal is sensitive to the parametric shift;
   measuring performance of the sensitive signal in reference to the reference signal;
   comparing the measured performance of the sensitive signal to a value, wherein the value represents a parametric shift tampering limit;
   generating a tamper signal in response to the step of comparing,
   wherein the parametric shift includes at least one of a temperature shift and a voltage shift; and
   powering down at least a portion of the IC in response to the tamper signal.

2. The method recited in claim 1 further comprising writing the value to a storage element.

3. The method recited in claim 1, wherein the reference signal is a reference clock and the sensitive signal is a sensitive clock.

4. The method recited in claim 3, wherein the sensitive clock has a frequency higher than frequency of the reference clock.

5. The method recited in claim 3, wherein the IC is a PLD, and wherein the supplying the reference clock comprises:
   configuring a programmable logic device (PLD) to provide a temperature-insensitive clock circuit having at least one temperature-insensitive transistor, wherein the temperature-insensitive clock circuit provides the reference clock.

6. The method recited in claim 3, wherein the supplying the reference clock comprises:
   enabling a clock manager (CM) of the PLD receiving the temperature-insensitive clock circuit and supplying the reference clock.

7. The method recited in claim 6, further comprising erasing at least a portion configuration of the PLD in response to the tamper signal.

8. The method recited in claim 1, further comprising coupling the tamper signal to a secure intellectual property (IP) block, wherein the secure IP block follows a security protocol in response to the tamper signal.

9. A method of configuring a programmable logic device (PLD) to detect a parametric shift comprising:
   configuring the PLD to include a core oscillator, wherein performance of the core oscillator is sensitive to the parametric shift;
   enabling a clock manager circuit of the PLD receiving a reference oscillator, wherein performance of the reference oscillator is insensitive to the parametric shift;
   configuring the PLD to measure performance of the core oscillator in reference to the clock manager circuit;
   configuring the PLD to compare the measured performance of the core oscillator to a value, wherein the value represents a parametric shift tampering threshold;
   generating a tamper signal in response to comparing the measured performance of the core oscillator to the value, wherein the tamper signal is indicative of the parametric shift; and powering down at least a portion of the PLD in response to the tamper signal.

10. The method recited in claim 9, wherein configuring the PLD to include the core oscillator comprises:
    configuring the PLD to include a ring oscillator, wherein the ring oscillator includes at least one lookup table (LUT) of the PLD.

11. The method recited in claim 10, further comprising enabling a multi gigabit transceiver (MGT), wherein the MGT includes a clock data recovery (CDR) block including the clock manager circuit.

12. The method recited in claim 10, further comprising enabling a digital clock manger (DCM) of the PLD configured to receive the reference oscillator.

13. In an integrated circuit (IC), a circuit for detecting a parametric shift comprising:
    a parametric-insensitive clock circuit having a first clock output, wherein the first clock output is insensitive to the parametric shift;
    a parametric-sensitive clock circuit having a second clock output, wherein the second clock output is sensitive to the parametric shift;
    a counter circuit having a first counter input coupled to the first clock output, a second counter input coupled to the second clock output, and a counter output, wherein the counter output is responsive to counting the first clock output and the second clock output;
    a comparator circuit having a first comparator input coupled to the counter output, a second comparator input coupled to receive a parametric shift tampering threshold, and a comparator output, wherein the comparator output is a tamper signal that is generated in response to comparing the counter output to the parametric shift tampering threshold, and wherein the comparator output indicates a parametric shift; and
    a secure IP block having a first secure IP input coupled to the comparator output, wherein the secure IP block follows a security protocol in response to the tamper signal.

14. The integrated circuit recited in claim 13, wherein the IC is a programmable logic device (PLD), and wherein the parametric-sensitive clock circuit is a ring oscillator including at least one look up table (LUT) of the PLD.

15. The integrated circuit recited in claim 14, wherein the parametric-insensitive clock is selected from the group consisting of a temperature-insensitive oscillator, a PLL having a first PLL input coupled to a parametric-insensitive oscillator, and a DCM having a first DCM input coupled to parametric-insensitive oscillator.

16. The integrated circuit recited in claim 15, wherein the temperature-insensitive oscillator comprises a temperature-insensitive ring oscillator having at least one temperature-insensitive transistor.

17. The integrated circuit recited in claim 14, wherein the secure IP block follows the security protocol selected from the group consisting of powering down at least a portion of the IC, erasing a configuration of the PLD, halting an operation of the secure IP block in response to the comparator output, self-destruct, asserting an alert signal, broadcasting a warning, and resetting at least a portion of the IC.

* * * * *